(12) United States Patent
Lu et al.

(10) Patent No.: US 12,452,532 B2
(45) Date of Patent: Oct. 21, 2025

(54) FOCUS QUALITY DETERMINATION THROUGH MULTI-LAYER PROCESSING

(71) Applicant: Beckman Coulter, Inc., Miami, FL (US)

(72) Inventors: Jiuliu Lu, Miami, FL (US); Bian Qian, Miami, FL (US); John S. Riley, Miami, FL (US); Bart Wanders, Trabuco Canyon, CA (US); Ken Good, Pasadena, CA (US)

(73) Assignee: Beckman Coulter, Inc., Miami, FL (US)

( * ) Notice: Subject to any disclaimer, the term of this patent is extended or adjusted under 35 U.S.C. 154(b) by 0 days.

(21) Appl. No.: 18/740,301

(22) Filed: Jun. 11, 2024

(65) Prior Publication Data

US 2024/0357232 A1 Oct. 24, 2024

Related U.S. Application Data

(63) Continuation of application No. PCT/US2022/052702, filed on Dec. 13, 2022.
(Continued)

(51) Int. Cl.
*H04N 23/67* (2023.01)
*G01N 15/01* (2024.01)
(Continued)

(52) U.S. Cl.
CPC ............. *H04N 23/67* (2023.01); *G01N 15/01* (2024.01); *G01N 15/1436* (2013.01); *G06T 3/40* (2013.01);
(Continued)

(58) Field of Classification Search
CPC . G06T 2207/20081; G06T 2207/20084; G06T 2207/30024; G06T 3/40;
(Continued)

(56) References Cited

U.S. PATENT DOCUMENTS 5,436,978 A 7/1995 Kasdan
7,319,907 B2 1/2008 Kasdan et al.
9,322,752 B2 4/2016 Wanders et al.

FOREIGN PATENT DOCUMENTS

JP 2020 531971 A 11/2020
WO WO 02/39059 A1 5/2002
WO WO-2019034328 A1 * 2/2019 ........... G03H 1/0866

OTHER PUBLICATIONS ip.com search.*
International Search Report and Written Opinion for PCT/US2022/052702 mailed on Apr. 17, 2023, 12 pages.

* cited by examiner

*Primary Examiner* — Nathan J Flynn
(74) *Attorney, Agent, or Firm* — FROST BROWN TODD LLP (57) ABSTRACT

A focusing distance (e.g., a distance between a focal plane of a camera used when n image was captured and the actual focal plane for an in-focus image) in a visual analysis system may be determined by subjecting one or more images captured by such a system to a multi-layer analysis. In such an analysis, an input may be subjected to one or more convolution filters, and the ultimate result of such convolution may be provided to a dense layer which can provide the focusing distance. This focusing distance may then be used to (re)focus a camera or for other purposes (e.g., generating an alert).

20 Claims, 7 Drawing Sheets

Related U.S. Application Data

(60) Provisional application No. 63/291,044, filed on Dec. 17, 2021.

(51) Int. Cl.
*G01N 15/1434* (2024.01)
*G06T 3/40* (2024.01)
*G06T 7/00* (2017.01)

(52) U.S. Cl.
CPC .. *G06T 7/0012* (2013.01); *G06T 2207/10056* (2013.01); *G06T 2207/10148* (2013.01); *G06T 2207/20081* (2013.01); *G06T 2207/20084* (2013.01); *G06T 2207/30024* (2013.01)

(58) Field of Classification Search
CPC ......... G06T 7/0012; G06T 2207/10056; G06T 2207/10148; H04N 23/67; G01N 15/01; G01N 15/01436
See application file for complete search history.

FOCUS QUALITY DETERMINATION THROUGH MULTI-LAYER PROCESSING

CROSS REFERENCE TO RELATED APPLICATIONS

This claims priority from, and is a continuation of, international patent application PCT/US2022/052702, entitled "Focus Quality Determination Through Multi-Layer Processing" filed on Dec. 13, 2022, which claims the benefit of, and priority to, provisional patent application 63/291,044, entitled "Autofocusing through multi-layer processing" and filed in the U.S. patent and trademark office Dec. 17, 2021. That application is hereby incorporated by reference in its entirety.

BACKGROUND

Blood cell analysis is one of the most commonly performed medical tests for providing an overview of a patient's health status. A blood sample can be drawn from a patient's body and stored in a test tube containing an anticoagulant to prevent clotting. A whole blood sample normally comprises three major classes of blood cells including red blood cells (erythrocytes), white blood cells (leukocytes) and platelets (thrombocytes). Each class can be further divided into subclasses of members. For example, five major types or subclasses of white blood cells (WBCs) have different shapes and functions. White blood cells may include neutrophils, lymphocytes, monocytes, eosinophils, and basophils. There are also subclasses of the red blood cell types. The appearances of particles in a sample may differ according to pathological conditions, cell maturity and other causes. Red blood cell subclasses may include reticulocytes and nucleated red blood cells.

This analysis may involve capturing images of a sample comprising blood cells, and the higher the quality of these images, the more suitable they are for analysis. However, capturing high quality images presents many problems. For example, ensuring that an image is in focus can be complicated by the fact that changes in temperature or other factors connected with the operation of an analyzer may cause an optics system that was previously in focus to require refocusing. Additionally, some types of focusing are not effective on all types of blood cells that may be found in a sample (e.g., a focusing method based on feature extraction may be suitable for red blood cells but not white blood cells). Accordingly, there is a need for improvements in the art related to focusing of analyzer optics systems, such as by automatically refocusing during image acquisition, or by detecting focusing issues so that appropriate responsive steps can be taken. Such improvements may have utility in, for instance, a static imaging system (e.g., where a sample is static or fixed at an imaging location) as well as a flow imaging system (e.g., where a sample is flowed through an imaging location).

SUMMARY

Described herein are devices, systems and methods for automatically determining focusing quality of an optical analysis system, such as a bioassay system which captures images of blood cells from a blood sample.

An illustrative implementation of such technology relates to a system comprising a camera adapted to capture images of blood samples and a non-transitory computer readable medium. Such a medium may store a plurality of sets of convolution filters and a fully connected layer. Such a medium may also store instructions operable to, when executed by a processor, generating an output for each set of convolution filters, where such output may have a depth equal to that set of convolution filters' cardinality. This may be done by performing steps comprising, for each set of convolution filters, convolving an input with each filter in that set. In such a case the input for a first set of convolution filters may be an image captured by the camera, and the input for each other set of convolution filters may be an output of a different set of convolution filters. In such a case, the medium may also store instructions to generate a focus distance by performing acts comprising providing an output generated for a set of convolution filters as an input to the fully connected layer, and focusing the camera based on the focus distance.

While multiple examples are described herein, still other examples of the described subject matter will become apparent to those skilled in the art from the following detailed description and drawings, which show and describe illustrative examples of disclosed subject matter. As will be realized, the disclosed subject matter is capable of modifications in various aspects, all without departing from the spirit and scope of the described subject matter. Accordingly, the drawings and detailed description are to be regarded as illustrative in nature and not restrictive.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The present disclosure relates to apparatus, systems, compositions, and methods for analyzing a sample containing particles. In one embodiment, the invention relates to an automated particle imaging system which comprises an analyzer which may be, for example, a visual analyzer. In some embodiments, the visual analyzer may further comprise a processor to facilitate automated analysis of the images.

According to some aspects of this disclosure, a system comprising a visual analyzer may be provided for obtaining images of a sample comprising particles suspended in a liquid. Such a system may be useful, for example, in characterizing particles in biological fluids, such as detecting and quantifying erythrocytes, reticulocytes, nucleated red blood cells, platelets, and white blood cells, including white blood cell differential counting, categorization and subcategorization and analysis. Other similar uses such as characterizing blood cells from other fluids are also contemplated.

The discrimination of blood cells in a blood sample is an exemplary application for which the subject matter is particularly well suited, though other types of body fluid samples may be used. For example, aspects of the disclosed technology may be used in analysis of a non-blood body fluid sample comprising blood cells (e.g., white blood cells and/or red blood cells), such as serum, bone marrow, lavage fluid, effusions, exudates, cerebrospinal fluid, pleural fluid, peritoneal fluid, and amniotic fluid. It is also possible that the sample can be a solid tissue sample, e.g., a biopsy sample that has been treated to produce a cell suspension. The sample may also be a suspension obtained from treating a fecal sample. A sample may also be a laboratory or production line sample comprising particles, such as a cell culture sample. The term sample may be used to refer to a sample obtained from a patient or laboratory or any fraction, portion or aliquot thereof. The sample can be diluted, divided into portions, or stained in some processes.

In some aspects, samples are presented, imaged and analyzed in an automated manner. In the case of blood samples, the sample may be substantially diluted with a suitable diluent or saline solution, which reduces the extent to which the view of some cells might be hidden by other cells in an undiluted or less-diluted sample. The cells can be treated with agents that enhance the contrast of some cell aspects, for example using permeabilizing agents to render cell membranes permeable, and histological stains to adhere in and to reveal features, such as granules and the nucleus. In some cases, it may be desirable to stain an aliquot of the sample for counting and characterizing particles which include reticulocytes, nucleated red blood cells, and platelets, and for white blood cell differential, characterization and analysis. In other cases, samples containing red blood cells may be diluted before introduction to the flow cell and/or imaging in the flow cell or otherwise.

The particulars of sample preparation apparatus and methods for sample dilution, permeabilizing and histological staining, generally may be accomplished using precision pumps and valves operated by one or more programmable controllers. Examples can be found in patents such as U.S. Pat. No. 7,319,907. Likewise, techniques for distinguishing among certain cell categories and/or subcategories by their attributes such as relative size and color can be found in U.S. Pat. No. 5,436,978 in connection with white blood cells. The disclosures of these patents are hereby incorporated by reference in their entirety.

Figure 1:
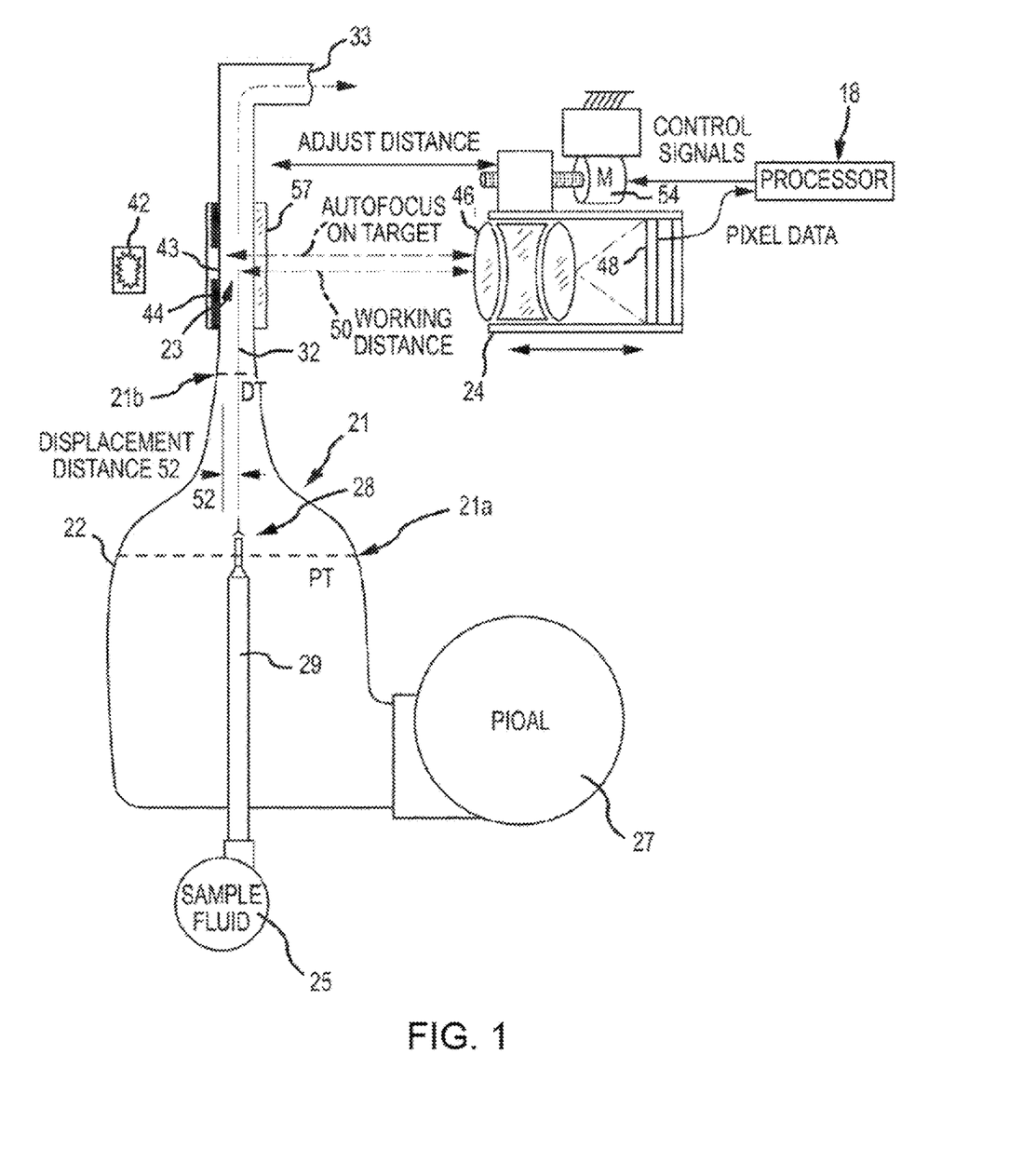
FIG. 1 is a schematic illustration, partly in section and not to scale, showing operational aspects of an exemplary flow-cell, autofocus system and high optical resolution imaging device for sample image analysis using digital image processing.

Turning now to the drawings, FIG. 1 schematically shows an exemplary flowcell 22 for conveying a sample fluid through a viewing zone 23 of a high optical resolution imaging device 24 in a configuration for imaging microscopic particles in a sample flow stream 32 using digital image processing. Flowcell 22 is coupled to a source 25 of sample fluid which may have been subjected to processing, such as contact with a particle contrast agent, composition and heating. Flowcell 22 is also coupled to one or more sources 27 of a particle and/or intracellular organelle alignment liquid (PIOAL), such as a clear glycerol solution having a viscosity that is greater than the viscosity of the sample fluid.

The sample fluid is injected through a flattened opening at a distal end 28 of a sample feed tube 29, and into the interior of the flowcell 22 at a point where the PIOAL flow has been substantially established resulting in a stable and symmetric laminar flow of the PIOAL above and below (or on opposing sides of) the ribbon-shaped sample stream. The sample and PIOAL streams may be supplied by precision metering pumps that move the PIOAL with the injected sample fluid along a flowpath that narrows substantially. The PIOAL envelopes and compresses the sample fluid in the zone 21 where the flowpath narrows. Hence, the decrease in flowpath thickness at zone 21 can contribute to a geometric focusing of the sample stream 32. The sample fluid ribbon 32 is enveloped and carried along with the PIOAL downstream of the narrowing zone 21, passing in front of, or otherwise through the viewing zone 23 of, the high optical resolution imaging device 24 where images are collected, for example, using a CCD 48. Processor 18 can receive, as input, pixel data from CCD 48. The sample fluid ribbon flows together with the PIOAL to a discharge 33.

As shown here, the narrowing zone 21 can have a proximal flowpath portion 21a having a proximal thickness PT and a distal flowpath portion 21b having a distal thickness DT, such that distal thickness DT is less than proximal thickness PT. The sample fluid can therefore be injected through the distal end 28 of sample tube 29 at a location that is distal to the proximal portion 21a and proximal to the distal portion 21b. Hence, the sample fluid can enter the PIOAL envelope as the PIOAL stream is compressed by the zone 21. wherein the sample fluid injection tube has a distal exit port through which sample fluid is injected into flowing sheath fluid, the distal exit port bounded by the decrease in flowpath size of the flowcell.

The digital high optical resolution imaging device 24 with objective lens 46 is directed along an optical axis that intersects the ribbon-shaped sample stream 32. The relative distance between the objective 46 and the flowcell 33 is variable by operation of a motor drive 54, for resolving and collecting a focused digitized image on a photosensor array. Additional information regarding the construction and operation of an exemplary flowcell such as shown in FIG. 1 is provided in U.S. Pat. No. 9,322,752, entitled "Flowcell Systems and Methods for Particle Analysis in Blood Samples," filed on Mar. 17, 2014, the disclosure of which is hereby incorporated by reference in its entirety.

Figure 2:
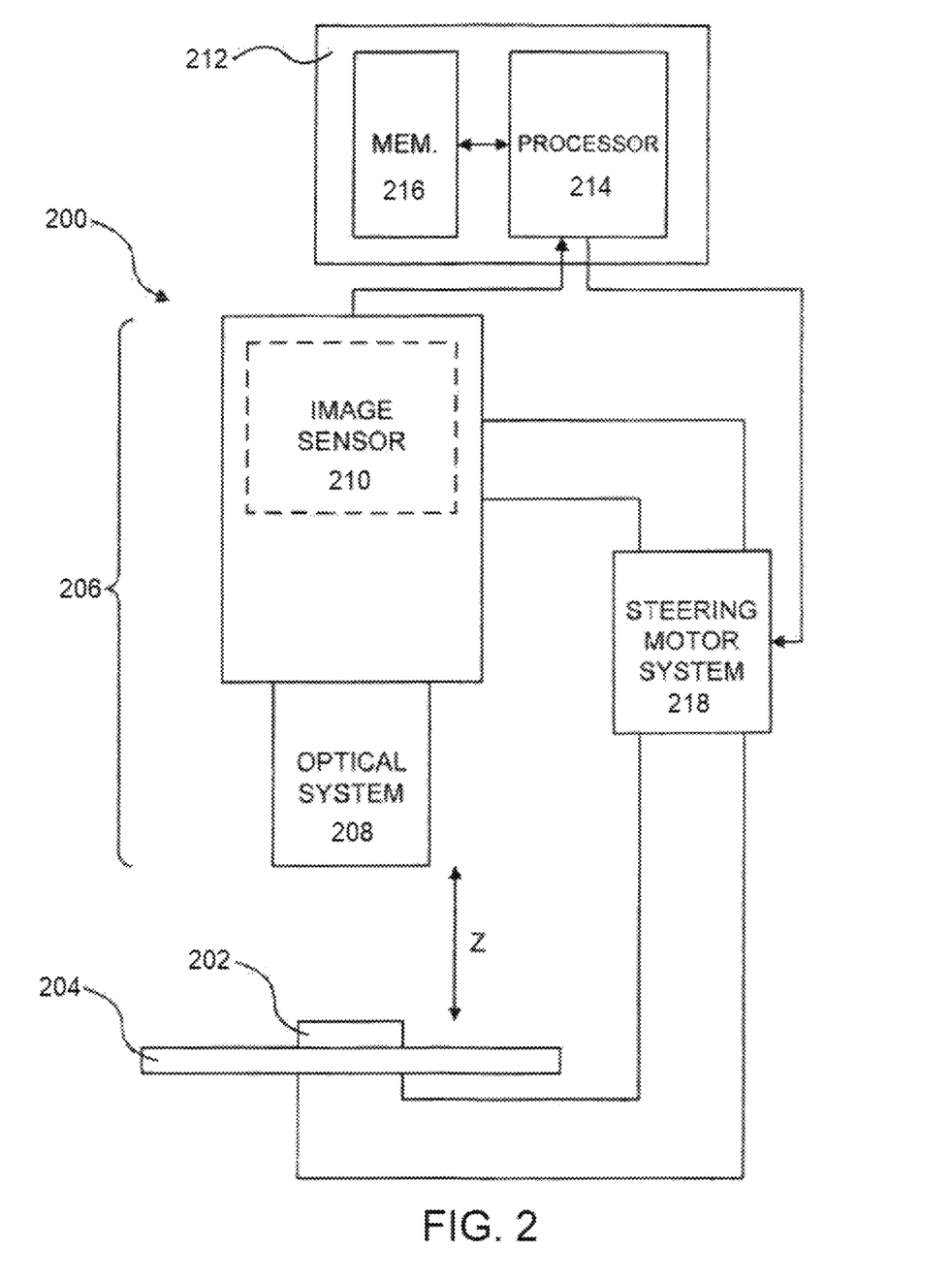
FIG. 2 illustrates a slide-based vision inspection system in which aspects of the disclosed technology may be used.

Aspects of the disclosed technology may also be applied in contexts other than flowcell systems such as shown in FIG. 1. For example, FIG. 2 illustrates a slide-based vision inspection system 200 in which aspects of the disclosed technology may be used. In the system shown in FIG. 2, a slide 202 comprising a sample, such as a blood sample, is placed in a slide holder 204. The slide holder 204 may be adapted to hold a number of slides or only one, as illustrated in FIG. 2. An image capturing device 206, comprising an optical system 208 and an image sensor 210, is adapted to capture image data depicting the sample in the slide 202. Further, in order to control the light environment and hence get image data which is easier to analyze, a light emitting device (not shown) may be used.

The image data captured by the image capturing device 206 can be transferred to an image processing device 212. The image processing device 112 may be an external apparatus, such as a personal computer, connected to the image capturing device 206. Alternatively, the image processing device 212 may be incorporated in the image capturing device 206. The image processing device 212 can comprise a processor 214, associated with a memory 216, configured to determine changes needed to address differences between the actual focus and a correct focus for the image capturing device 206. When the difference is determined an instruction can be transferred to a steering motor system 218. The steering motor system 218 can, based upon the instruction from the image processing device 212, alter the distance z between the slide 202 and the optical system 208.

Figure 3:
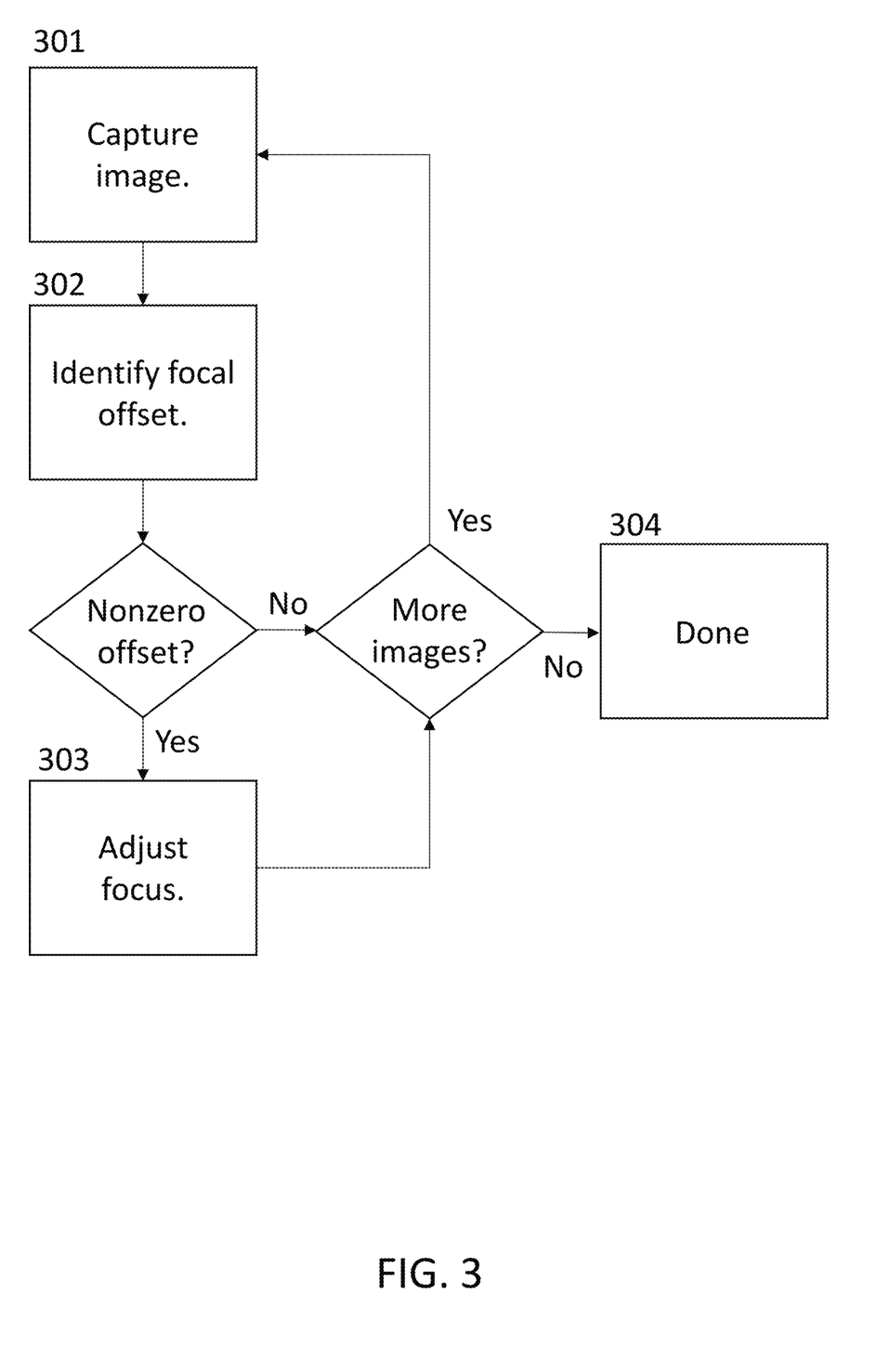
FIG. 3 illustrates a process which may be used to refocus an imaging device.

In a system such as shown in FIG. 1 or FIG. 2, components such as motor drive 54 or steering motor system 218 may be used in a process such as shown in FIG. 3 to continuously refocus imaging devices (e.g., digital high optical resolution imaging device 24 or image capturing device 206) to maximize the quality of images produced for subsequent analysis. In a process such as shown in FIG. 3, when an image is captured 301, it may be analyzed 302 to identify an offset between the expected focusing plane (i.e., the plane on which the imaging device was focused when it was captured) and the correct focusing plane (i.e., the plane on which the imaging device would need to have been focused to capture an in-focus image). In the event that the offset was zero (i.e., the plane on which the imaging device was focused when the image was captured was the correct focusing plane), the process may continue with capturing images until all of the images needed for analysis had been captured. Alternatively, if the offset was not zero (e.g., if there was a 2 µm separation between the expected and correct focusing planes), then the imaging device's focusing plane could be adjusted 303 to account for the offset. For instance, if the correct focusing plane was 2 µm below the expected focusing plane, then a component such as the motor drive 54 or steering motor system 218 may be used to move the imaging device 2 µm closer to the sample, or to move the sample (e.g., by moving the flowcell holding the sample) 2 µm closer to the imaging device, or to move a lens of the imaging device 2 µm closer to the imaging device (e.g., keeping the image device fixed while zooming the lens closer to the flowcell) so that the expected and correct focusing planes would be the same for the next image. This process could then be repeatedly performed until the image capturing was complete 304, thereby ensuring that any deviations caused by factors such as temperature changes would be detected and addressed.

Figure 4:
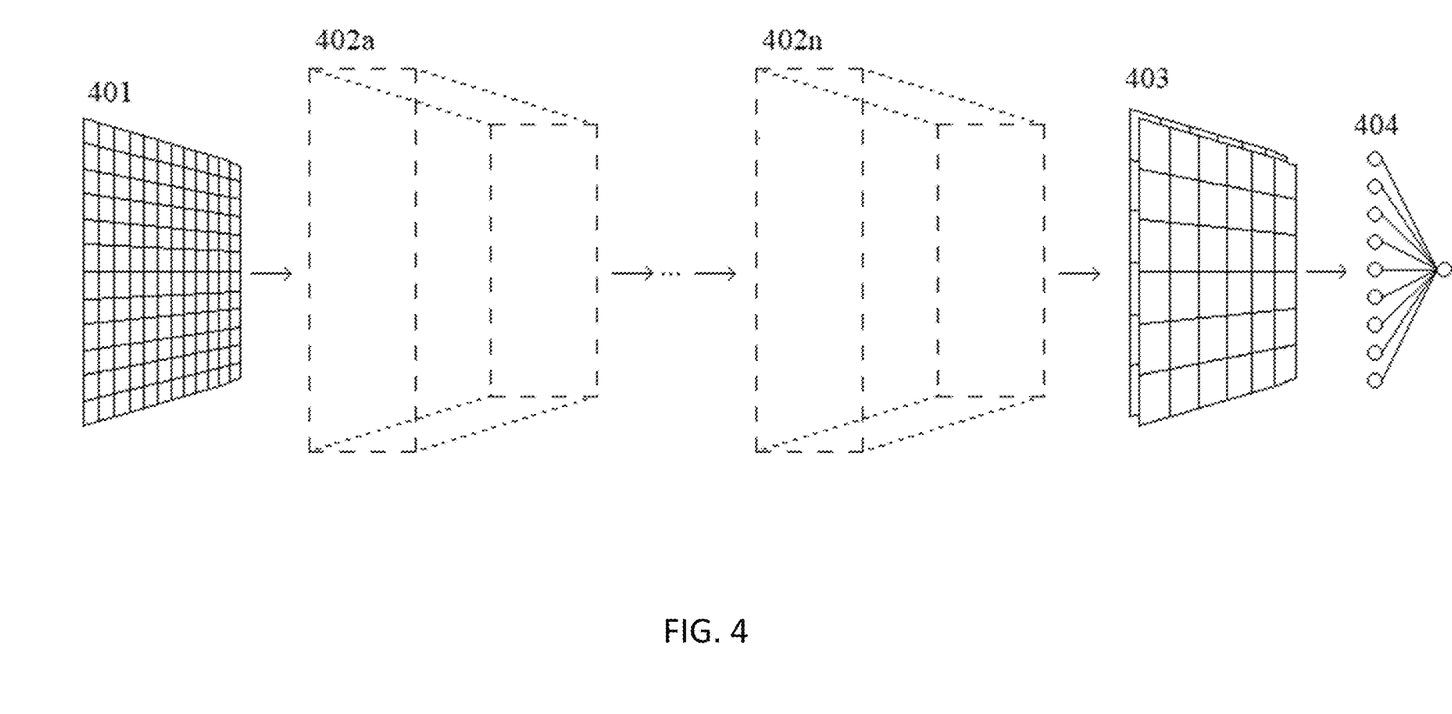
FIG. 4 illustrate an architecture that may be used in analyzing images.
Figure 5:
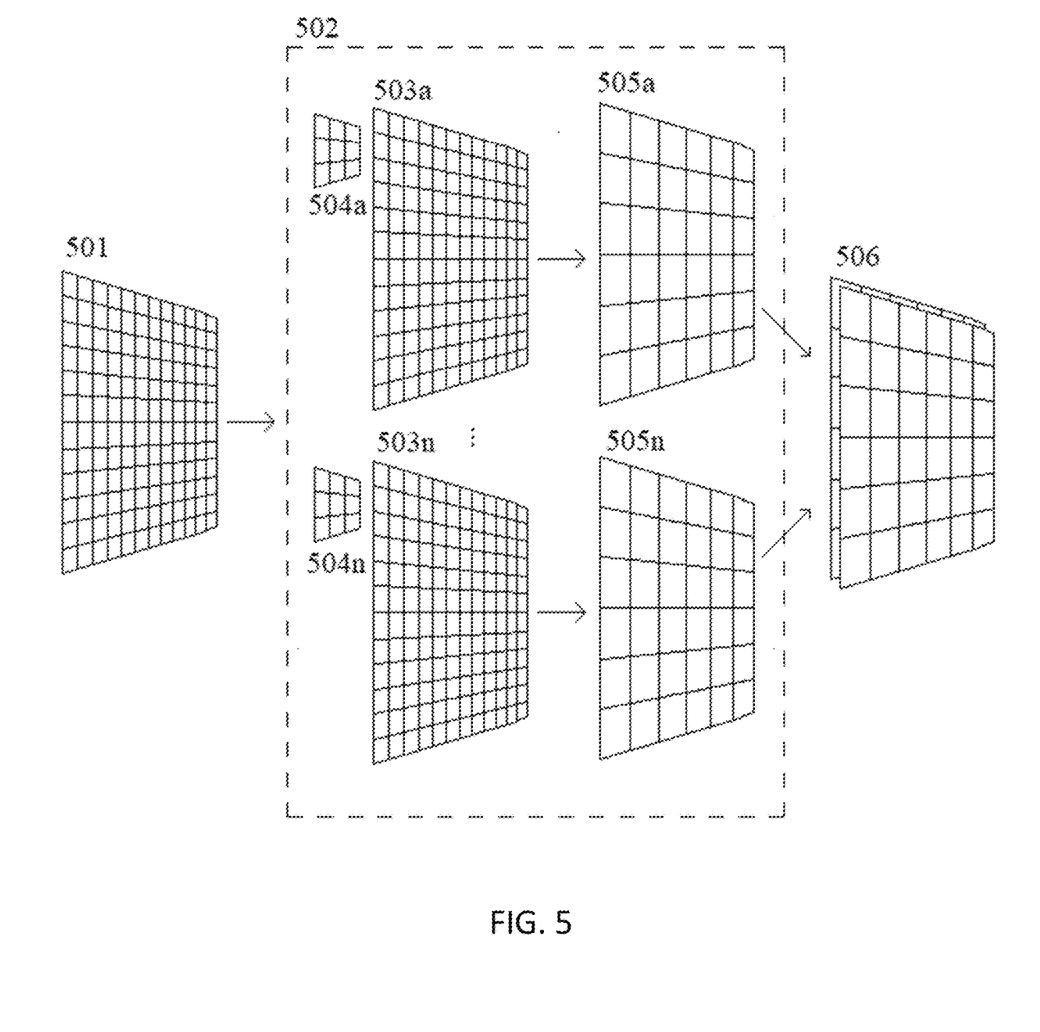
FIG. 5 illustrates of a layer which may be included in an architecture such as shown in FIG. 4.

Turning now to FIG. 4, that figure illustrates an architecture which can be used in analyzing images such as during the identification 302 of a focal offset in the process of FIG. 3. In the architecture of FIG. 4, an input image 401 would be analyzed in a series of stages 402a-402n, each of which may be referred to as a "layer," and which is illustrated in more detail in FIG. 5. As shown in FIG. 5, an input 501 (which, in the initial layer 502a of FIG. 4 would be the input image 401, and otherwise would be the output of the preceding layer) is provided to a layer 502 where it would be processed to generate one or more transformed images 503a-503n. This processing may include convolving the input 501 with a set of filters 504a-504n, each of which would identify a type of feature from the underlying image that would then be captured in that filter's corresponding transformed image. For instance, as a simple example, convolving an image with the filter shown in table 1 could generate a transformed image capturing the edges from the input 501.

TABLE 1

[−1 −1 −1]
[−1  8 −1]
[−1 −1 −1]

More complicated filters are also possible. For example, in the case where the input 501 is a N×N 3 channel image (e.g., an RGB image, with red, blue and green color channels), it may be convolved with the 5×5×3 filter shown in table 2 to generate a transformed image.

TABLE 2

$$\begin{bmatrix}
[0.04650522, -0.04926911, 0.02570812] & [-0.04679897, -0.02855025, 0.04509202] & [-0.04720793, 0.0372874, 0.03181301] & [0.02428255, -0.04689784, 0.02353291] & [-0.02533956, -0.0304396, -0.0077401] \\
[0.02384185, 0.03695531, 0.01826208] & [0.04193044, -0.0033995, -0.02638082] & [0.04782341, -0.01051681, 0.03414269] & [-0.01796475, 0.0351479, 0.03261185] & [0.05550028, -0.02608217, 0.04993412] \\
[-0.04066563, -0.00967357, -0.03141861] & [0.01155995, 0.01795168, -0.03698134] & [-0.04191959, -0.05119167, -0.01905704] & [0.05489669, -0.04124821, 0.03067265] & [-0.04868646, -0.00779161, -0.02022763] \\
[-0.05393558, -0.00984658, 0.04765537] & [-0.06004449, 0.0459027, 0.03577675] & [0.04796177, 0.01333636, 0.02254324] & [0.03912429, -0.04295422, 0.05132324] & [0.01760398, 0.04638707, -0.04152211] \\
[-0.03861769, 0.04948885, -0.0229058] & [-0.00781422, -0.02290417, 0.05270623] & [-0.04334857, -0.02595517, 0.00498272] & [-0.00707148, 0.02235319, 0.00724897] & [-0.01981642, 0.01765939, -0.01664108]
\end{bmatrix}$$

As shown in FIG. 5, in addition to generating transformed images 503a-503n a layer may also generate a pooled image 505a-505n for each of the transformed images 503a-503n. This may be done, for example, by organizing the appropriate transformed image into a set of regions, and then replacing the values in that region with a single value, such as the maximum value for the region or the average of the values for the region. The result would be a pooled image whose resolution would be reduced relative to its corresponding transformed image based on the size of the regions it was split into (e.g., if the transformed image had N×N dimensions, and it was split into 2×2 regions, then the pooled image would have size (N/2)×(N/2)). These pooled images 505a-505n could then be combined into a single output image 506, in which each of the pooled images 505a-505n is treated as a separate channel in the output image 506. This output image 506 can then be provided as input to the next layer as shown in FIG. 4.

Returning to the discussion of FIG. 4, after a final output image 403 has been created through the various stages 402a-402n of processing, the final output image 403 could be provided as input to a neural network 404. This may be done, for example, by providing the value of each channel of each pixel in the output image 403 to an input node of a densely connected single layer network. The output of the neural network 404 could then be treated as indicating a characteristic of the input image 401 that could be used in improving the quality of future images captured by an imaging system (e.g., a distance of the focusing plane of the input image relative to an optimal focusing plane for capturing in-focus images).

Figure 6:
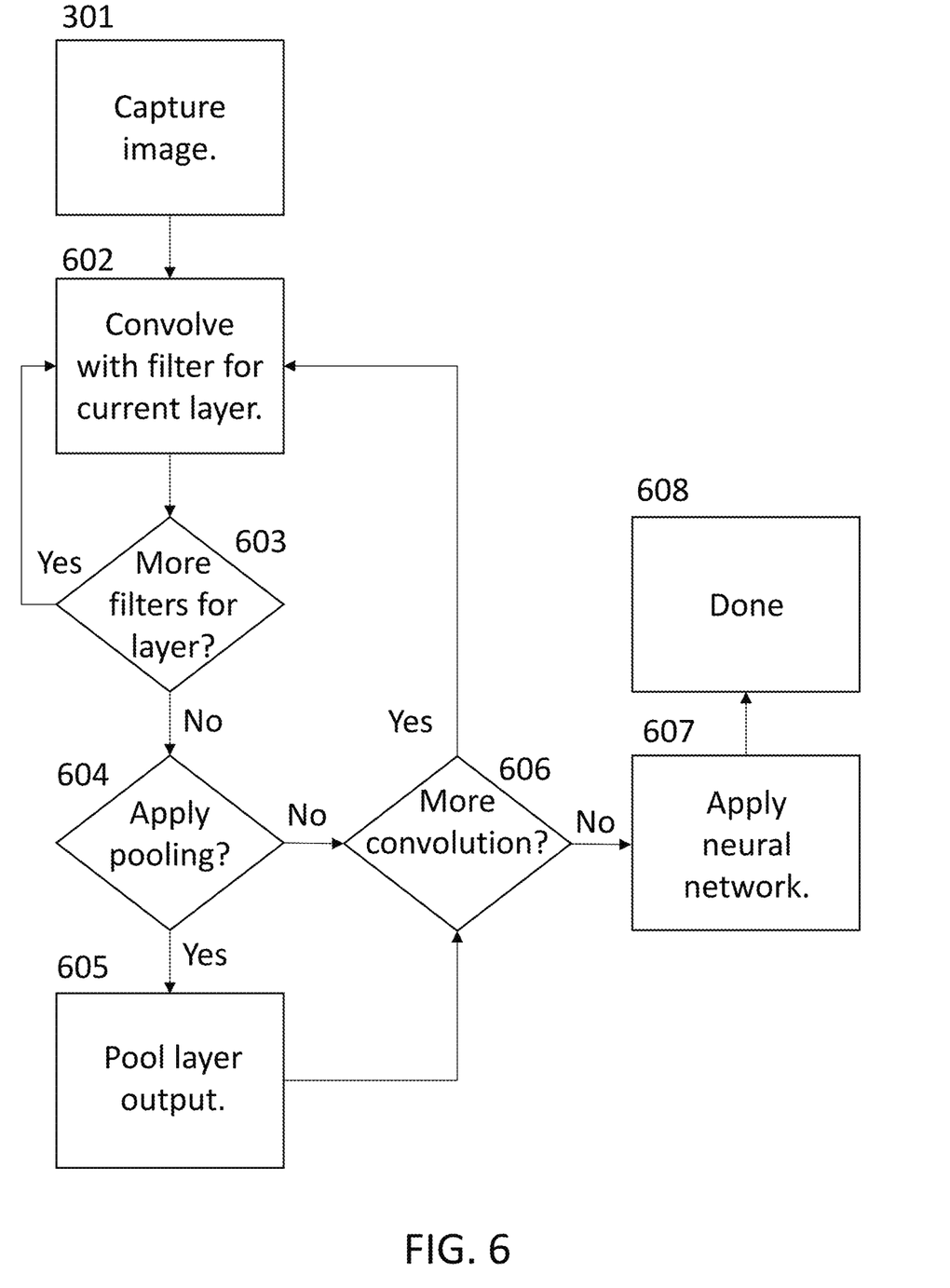
FIG. 6 illustrates a flowchart showing a method which could be used in an architecture such as shown in FIG. 4.

Turning now to FIG. 6, that figure illustrates a flowchart showing a method which could be used in an architecture such as shown in FIG. 4. Initially, in the method of FIG. 6, an image is captured 301. This image could be treated as an input image 401 as shown in FIG. 4, and convolved 602 with a filter for the current (e.g., the first) processing layer. A check 603 could then be performed to determine if the convolution 602 should be repeated with a different filter. For example, if the current layer was configured to generate n transformed images 503a-503n, then the convolution 602 could be performed n times, with a different filter being used each time until n transformed images had been created.

In a method such as shown in FIG. 6, after all of a layer's filters had been applied, a further check 604 could be performed to determine if pooling should be applied to the transformed images. As described previously in the context of FIG. 5, a pooled image may be created from a transformed image by splitting the transformed image into regions and replacing values for pixels in a region with a single pixel in a pooled image. However, this type of pooling may not be found in all layers, and so the check 604 determines if pooling should be applied. If so, then the transformed image(s) created by convolution may be pooled 605 as described previously in the context of FIG. 5.

Otherwise, no pooling is performed and a check 506 is made if more convolution is needed (e.g., if there are more layers). If so, then a method such as shown in FIG. 6 could proceed to the next layer, and begin convolving 602 the output of the preceding layer with the next layer's filters. Otherwise, the fully processed image obtained from the various convolution 602 and pooling 605 steps could be provided to a neural network 607. The method of FIG. 6 could then terminate 608, with the output of the neural network being treated as the result of the method itself. For example, if the method of FIG. 6 was implemented as a function to identify 302 the focal offset in the method of FIG. 3, then the method of FIG. 6 could terminate 608 by providing the result of applying 607 the neural network as a return value identifying 302 the focal offset.

An architecture such as shown and discussed in the context of FIGS. 4-6 may be implemented in a variety of manners. For example, it is possible that such an architecture may be implemented as a convolutional neural network (CNN), in which each transformed image 502a-502n would be represented by an output layer in which there was one output node for each pixel in the transformed image, in which each output node would be connected to input nodes representing the pixels in the input image 501 that would be convolved to generate the value of that output node's pixel in the transformed image, and in which the weights of the connections between the input and output nodes would be equal to the values of the filter that would be used for the convolution. In this type of implementation, the specific values used for analyzing images and generating outputs can be optimized by training the neural network using blood cell images having known focusing positions to minimize regression errors between known and calculated focusing positions. For example, CNN implementations having the layers described below in tables 3 and 4 have been found to be effective in determining focus for WBC images.

TABLE 3

| Layer Number | Layer Description |
| --- | --- |
| 1 | Input layer that receives a 128 × 128 × 3 RGB image |
| 2 | Convolves input with 64 5 × 5 filters using ReLU activation (i.e., an activation function with a value of zero for negative inputs, and the value of the input itself for non-negative inputs) to provide 64 transformed images, then applies 2 × 2 max pooling (i.e., each 4 pixels in a transformed image are converted to 1 pixel in a pooled image where the pixel in the pooled image has a value equal to the maximum value from the 4 pixels in the transformed image) to produce a 64 × 64 × 64 output. |
| 3 | Convolves input with 128 5 × 5 filters using ReLU activation to provide 128 transformed images, then applies 2 × 2 max pooling to produce a 32 × 32 × 128 output. |
| 4 | Convolves input with 256 5 × 5 filters using ReLU activation, then applies 2 × 2 max pooling to produce a 16 × 16 × 256 output. |
| 5 | Convolves input with 512 5 × 5 filters using ReLU activation, then applies 2 × 2 max pooling to produce an 8 × 8 × 512 output. |
| 6 | Convolves input with 512 5 × 5 filters using ReLU activation, then applies 2 × 2 max pooling to produce a 4 × 4 × 512 output. |
| 7 | Applies each output from preceding layer to an input node in a densely connected 1 output neural network. |

TABLE 4

| Layer Number | Layer Description |
| --- | --- |
| 1 | Input layer that receives a 128 × 128 × 3 RGB image |
| 2 | Convolves input with 64 5 × 5 filters using ReLU activation to provide 64 transformed images, then applies 2 × 2 max pooling to produce a 64 × 64 × 64 output. |

TABLE 4-continued

| Layer Number | Layer Description |
|---|---|
| 3 | Convolves input with 128 5 × 5 filters using ReLU activation, then applies 2 × 2 max pooling to produce a 32 × 32 × 128 output. |
| 4 | Convolves input with 128 5 × 5 filters using ReLU activation, then applies 2 × 2 max pooling to produce a 16 × 16 × 128 output. |
| 5 | Convolves input with 256 3 × 3 filters using ReLU activation, then applies 2 × 2 max pooling to produce an 8 × 8 × 256 output. |
| 6 | Convolves input with 256 3 × 3 filters using ReLU activation, then applies 2 × 2 max pooling to produce a 4 × 4 × 256 output. |
| 7 | Convolves input with 512 3 × 3 filters using ReLU activation, then applies 2 × 2 max pooling to produce a 2 × 2 × 512 output. |
| 8 | Convolves input with 1024 3 × 3 filters using ReLU activation, then applies 2 × 2 max pooling to produce a 1 × 1 × 1024 output. |
| 9 | Provides the 1024 channels of the previous layer as inputs to a densely connected 1024 input-200 output neural network. |
| 10 | Provides the outputs of the previous layer as inputs to a densely connected one output neural network. |

Architectures such as those having structures as set forth in tables 3 and 4 can be trained to perform a focus analysis using blood cell images having known focusing positions to minimize regression error. Such blood cell images can be acquired through human annotation of images produced during normal operation of an analyzer (e.g., a human inspecting images and then labeling them with the difference, if any, between actual and optimal focal planes based on their own experience and training with identifying focused cell images and out of focused cell images), but they could also be acquired in other manners. For example, an analyzer can be used to capture images which are in focus, and images which are out of focus by known amounts by intentionally changing the relationship between the imaging and the sample(s) being imaged after the in focus images are captured.

Table 5 show examples of how an intentional offsetting of an ideal focal distance can be used as part of a training procedure. In various examples, a camera or camera lens is set at a first ideal focal position to capture an in focus blood cell. The camera or camera lens is then offset in either direction to establish a training set for out of focus data. For instance, a camera or camera lens may start at position X which correlates to an ideal focal quality position (e.g., offset zero). It may then be offset in both directions, for example between −1 to +1 microns in either direction, between −2 to +2 microns in either direction, between −3 to +3 microns in either direction, between −4 to +4 microns in either direction, or between −5 to +5 microns in either direction in fixed interval (e.g., intervals of 0.1 microns, 0.2 microns, 0.3 microns, 0.4 microns, or 0.5 microns). In the context of Table 5, X indicates the start position and n indicates the offset increment (e.g., 0.3 microns) defining the fixed intervals that the camera offsets in each sample run. Other approaches are also possible, such as moving in variable increments, moving in increments which are different for different directions (e.g., moving away from a flowcell in increments of 0.3 microns and moving closer to the flowcell in increments of 0.2 microns), obtaining images from different numbers of positions than shown in table 5 (e.g., moving to 6n closer to the flowcell and 4n away from the flowcell), etc. Different types of training data creation, such as providing sets of images to a human reviewer and asking him or her to specify an offset distance for each image, are also possible. Accordingly, the description of how intentional offsetting of an ideal focal distance can be used as part of a training procedure should be understood as being illustrative only, and should not be treated as implying limitations on the protection provided by this document or any related documents.

In some examples, this training step is performed for separate groupings of blood cells. For instance, Red Blood Cells in a first sample, and White Blood cells in another sample so that the system is trained to identify focal quality from smaller cells (e.g., red blood cells) and larger cells (e.g., White blood cells). The various types of cells used to train the system can include Red blood cells, Platelets, and various groupings of White blood cells (neutrophils, lymphocytes, monocytes, eosinophils, and basophils). In other examples, the system is solely trained on a particular cell type (e.g., only red blood cells, only white blood cells, or only specific types of white blood cells such as only Neutrophils).

TABLE 5

| Focal Position | Focal Position Description |
|---|---|
| X − 5n | 5 units out of focus too far away from flowcell |
| X − 4n | 4 units out of focus too far away from flowcell |
| X − 3n | 3 units out of focus too far away from flowcell |
| X − 2n | 2 units out of focus too far away from flowcell |
| X − n | 1 unit out of focus too far away from flowcell |
| X | Ideal focal position |
| X + n | 1 units out of focus too close to flowcell |
| X + 2n | 2 units out of focus too close to flowcell |
| X + 3n | 3 units out of focus too close to flowcell |
| X + 4n | 4 units out of focus too close to flowcell |
| X + 5n | 5 units out of focus too close to flowcell |

Figure 7:
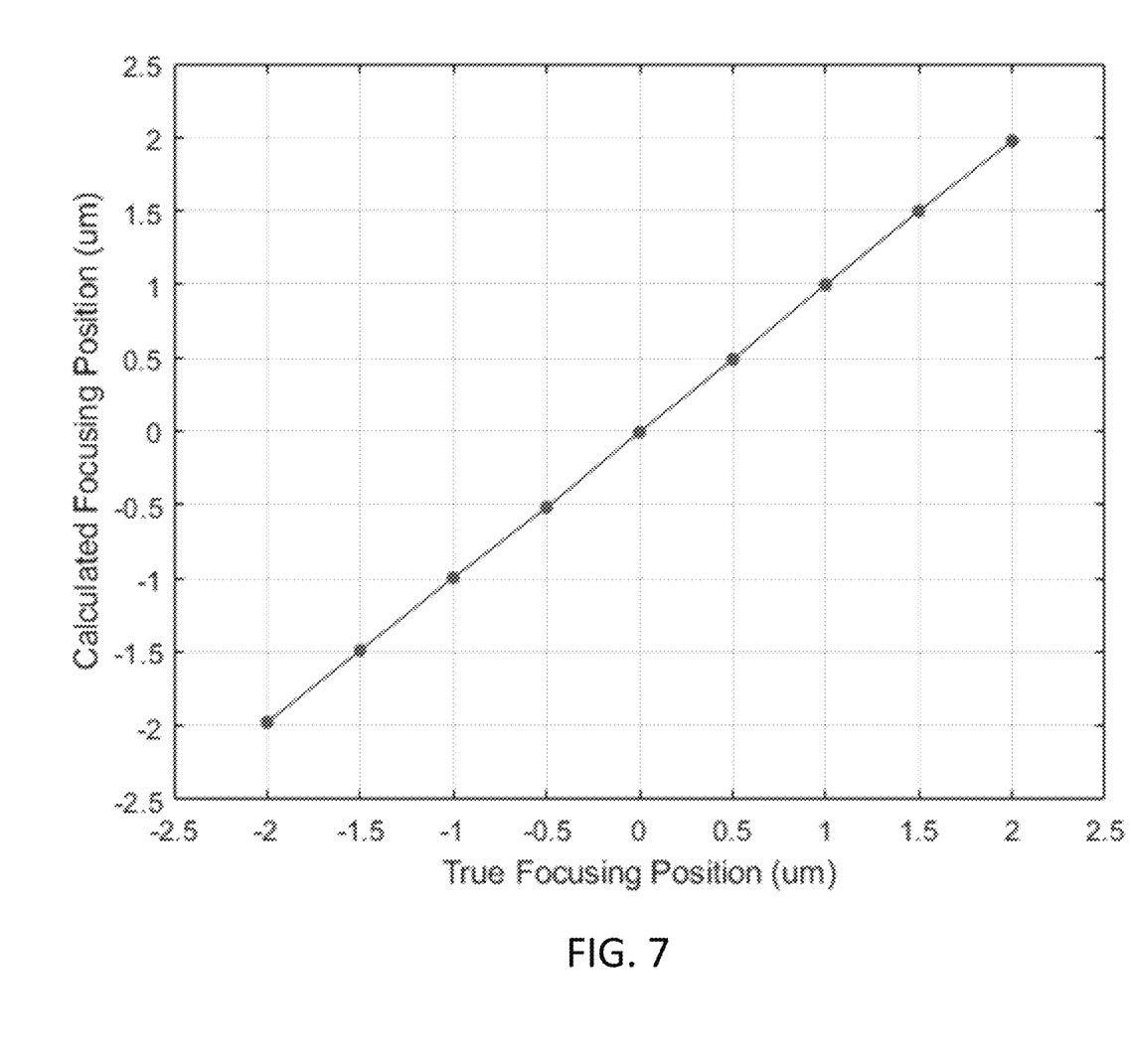
FIG. 7 illustrates results of determining focusing positions on blood sample runs used to generated white blood cell (WBC) images.

After training such as described above was performed for the architectures shown in tables 3 and 4, networks implemented using those structures were found to produce the results shown in FIG. 7 on 9 blood sample runs used to generate WBC images. In those runs, each run would be set up with a predetermined focusing plane ranging from −2 μm to 2 μm offset from the correct focusing plane, and would take hundreds of images of WBCs using that focus. The CNNs then calculated the focusing positions for each image in the run, and the median value of all calculated focusing positions was treated as the calculated focusing position for that sample run. As shown in FIG. 7, this provided good correlation between true and calculated focusing positions, validating this type of multilayer analytic approach for autofocusing on blood sample images. Additionally, while the test whose results are shown in FIG. 7 was made using WBC images, it will be apparent to one of ordinary skill in the art that the same type of approach (e.g., training a CNN using the type of image it would be evaluating, using the trained CNN in an autofocusing method) could also be applied for red blood cell (RBC) images, or images with both RBCs and WBCs.

Other variations and implementations of the disclosed technology are also possible. For example, while the above illustrations provided particular dimensions for filters, those dimensions are not intended to be limiting, and the inventors contemplate that other sizes (e.g., dimensions from 3×3 to 9×9) could be utilized when performing convolutions such as described in the context of FIGS. 4-6 and tables 1-2. Similarly, while the above illustrations included particular inputs, those inputs should also be understood as being non-limiting, and the inventors contemplate that other inputs are possible. For example, additional input channels in addition to, or as alternatives to, the 3 channel inputs noted in the context of tables 1 and 2 may be used in some cases. Additionally, even when input channels are held constant, the input dimensions may also be varied. For example, structures such as described in tables 1 and 2 may be varied to have inputs in the form of N×N×3, where N can range from tens to hundreds. Variations on physical devices used for implementing the disclosed technology are also possible. For example, while FIGS. 1 and 2 illustrate systems in which the disclosed technology may be used for focusing, the focusing technology described herein may be applied in other types of systems as well. Indeed, the inventors contemplate that auto-focusing such as described herein may be used to improve image quality in any type of device which captures static or flow images of blood cells. Accordingly, the above figures and tables and their associated discussion should not be used to imply limitations on the scope of protection provided by this document or any other document that claims the benefit of, or is otherwise related to, this document.

Variations may also be possible in methods which may utilize focusing technology such as described herein. For example, an autofocusing process such as described herein may be implemented to run a series of samples to determine how a camera should be focused, and adjust the focus on a run by run basis rather than on an image by image basis. Similarly, rather than automatically refocusing a camera, a focusing position may be used to generate an alert (e.g., if the difference between expected and correct focusing planes exceeds a threshold, or shows a trend that focus is drifting), after which point the user may decide whether to refocus the analyzer or continue with the then current imaging task. Automatic focusing such as described herein may also/ alternatively be included in a periodic (e.g., daily) quality control process. Data gathered in automatic focusing may subsequently be used to improve the operation of a system. For example, if it is found that adjustments made during automatic focusing are consistently in one directly, this may be used as a diagnostic indicator that there are system imperfections in the analyzer's mechanical or optical components that, when fixed, may reduce the need for automatic refocusing. As another example of how automatic focusing as described herein may be applied, consider that, in some cases, even when focus is acceptable, different focusing positions within an acceptable range may result in different features being more or less clearly perceptible in the images. In such cases, focusing information may be used to characterize the images captured by the system (e.g., as being closer to, or farther from, the sample while within an acceptable range) so that downstream processing may be optimized as needed depending on what features are being detected (e.g., by applying a sharpening kernel if a particular feature may be more difficult to identify based on the characterization). Accordingly, the image by image autofocusing described previously should be understood as being illustrative only, and should not be treated as implying limitations on the protection provided by this or any related document.

Variations are also possible in how a focusing method such as described herein may be implemented. For instance, in some cases a method such as shown in FIG. 6 may include additional steps to facilitate the processing and utilization of images. An example of such an additional step may be to pre-process or reformat an image before subjecting it to analysis. This may include, in an example where processing is performed using a CNN trained to take a certain type of image as input (e.g., 128×128×3 RGB images), resizing images to match the training inputs before subjecting them to convolution and/or pooling. Accordingly, as with the potential contexts and applications in which the disclosed technology may be used, the specific implementation may vary from case to case, and the examples, figures and descriptions set forth herein should be understood as being illustrative only, and should not be treated as limiting.

As a further illustration of potential implementations and applications of the disclosed technology, the following examples are provided of non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A system for assessing focal quality of blood cell images comprising: a) a camera adapted to capture images of blood samples; b) a non-transitory computer readable medium storing: i) a plurality of sets of convolution filters; ii) a fully connected layer; iii) instructions operable to, when executed by a processor: A) for each set of convolution filters, generate an output having a depth equal to that set of convolution filters' cardinality by performing acts comprising, for each convolution filter in that set of convolution filters, convolving an input with that convolution filter, wherein: I) the input for a first set of convolution filters is an image captured by the camera; and II) for each set of convolution filters other than the first set of convolution filters, the input for that set of convolution filters is an output generated by a different set of convolution filters; and B) generate a focus distance by performing acts comprising, providing an output generated for a set of convolution filters as an input to the fully connected layer.

Example 2

The system of example 1, wherein, for each set of convolution filters: a) the input to that set of convolution filters has a resolution; b) the output generated for that set of convolution filters has a resolution; and c) the instructions stored on the non-transitory computer readable medium are operable to reduce the resolution of the output generated for that set of convolution filters from the resolution of the input to that set of convolution filters by pooling pixels in a plurality of regions, and, for each region, including a single value for that region in the output generated for that set of convolution filters.

Example 3

The system of example 2, wherein, for each region for each set of convolution filters, the single value included for that region in the output generated for that set of convolution filters is a maximum value for that region.

Example 4

The system of example 1, wherein the non-transitory computer readable medium stores the plurality of sets of convolution filters as weights in a convolutional neural network.

Example 5

The system of example 1, wherein: a) the fully connected layer comprises a plurality of inputs and a plurality of outputs; b) the non-transitory computer readable medium stores instructions operable to, when executed by the processor, generate the focus distance by performing acts comprising: i) providing each output of the fully connected layer to an input of a second fully connected layer; and ii) obtaining the focus distance as an output of the second fully connected layer.

Example 6

The system of example 1, wherein: a) the system comprises a flowcell, wherein the flowcell comprises a viewing zone and is coupled to a source of sample fluid and a source of alignment fluid, wherein the alignment fluid is transparent and has a higher viscosity than the sample fluid; and b) the camera is adapted to capture images of blood samples by capturing images of particles comprised by a stream of sample fluid through a layer of alignment fluid disposed between the stream of sample fluid and the camera as the particles comprised by the stream of sample fluid flow through the viewing zone of the flowcell.

Example 7

The system of example 6, wherein: a) the system comprises a motor; and b) the instructions stored on the non-transitory computer readable medium comprise instructions operable to, when executed by the processor, focus the camera by using the motor to change a position of the camera relative to the viewing zone of the flowcell based on the focus distance.

Example 8

The system of example 7, wherein: a) the non-transitory computer readable medium is operable to, when executed by the processor, obtain a plurality focus distances, wherein: i) each focus distance from the plurality of focus distances corresponds to a different image captured by the camera; and ii) the focus distance is comprised by the plurality of focus distances; and b) focusing the camera by using the motor to change the position of the camera relative to the viewing zone of the flowcell based on the focus distance comprises: i) determining a median of the plurality of focus distances; and ii) translating the camera a distance equal to the median of the plurality of focus distances.

Example 9

The system of example 1, wherein: a) the first set of convolution filters is adapted to receive images having a predetermined size as input; and b) the non-transitory computer readable medium is operable to, when executed by the processor: i) resize a raw image captured by the camera to match the predetermined size; and ii) provide the resized image as the input for the first set of convolution filters.

Example 10

The system of example 1, wherein the first set of convolution filters is adapted to receive an image depicting one or more white blood cells as the input.

Example 11

A method of assessing focal quality of blood cell images comprising: a) for each of a plurality of convolution filters, generating an output having a depth equal to that set of convolution filters' cardinality by performing acts comprising, for each convolution filter in that set of convolution filters, convolving an input with that convolution filter, wherein: i) the input for a first set of convolution filters is an image captured by a camera and comprises a set of blood cells; and ii) for each set of convolution filters other than the first set of convolution filters, the input for that set of convolution filters is an output generated by a different set of convolution filters; and b) generating a focus distance by performing acts comprising providing an output generated for a set of convolution filters as an input to a fully connected neural network layer.

Example 12

The method of example 11, wherein, for each set of convolution filters: a) the input to that set of convolution filters has a resolution; b) the output generated for that set of convolution filters has a resolution; and c) the method comprises reducing the resolution of the output generated for that set of convolution filters from the resolution of the input to that set of convolution filters by pooling pixels in a plurality of regions, and, for each region, including a single value for that region in the output generated for that set of convolution filters.

Example 13

The method of example 12, wherein, for each region for each set of convolution filters, the single value included for that region in the output generated for that set of convolution filters is a maximum value for that region.

Example 14

The method of example 11, wherein a) the fully connected neural network layer comprises a plurality of inputs and a plurality of outputs; b) the method comprises generating the focus distance by performing acts comprising: i) providing each output of the fully connected neural network layer to an input of a second fully connected neural network layer; and ii) obtaining the focus distance as an output of the second fully connected neural network layer.

Example 15

The method of example 11, wherein the method comprises capturing the image provided as input to the first set of convolution filters by performing acts comprising: a) flowing a stream of sample fluid through a flowcell, wherein the flowcell comprises a viewing zone and is coupled to a source of sample fluid and a source of alignment fluid, wherein the alignment fluid is transparent and has a higher viscosity than the sample fluid; and b) imaging a particle comprised by the stream of sample fluid through a layer of alignment fluid disposed between the stream of sample fluid and the camera as the particle comprised by the stream of sample fluid flows through the viewing zone of the flowcell.

Example 16

The method of example 15, wherein the method comprises focusing the camera by using a motor to change a position of the camera relative to the viewing zone of the flowcell based on the focus distance Example 17

The method of example 16, wherein: a) the method comprises obtaining a plurality focus distances, wherein: i) each focus distance from the plurality of focus distances corresponds to a different image captured by the camera; and ii) the focus distance is comprised by the plurality of focus distances; and b) focusing the camera by using the motor to change the position of the camera relative to the viewing zone of the flowcell based on the focus distance comprises: i) determining a median of the plurality of focus distances; and ii) translating the camera a distance equal to the median of the plurality of focus distances.

Example 18

The method of example 11, wherein: a) the first set of convolution filters is adapted to receive images having a predetermined size as input; and b) the method comprises: i) resizing a raw image captured by the camera to match the predetermined size; and ii) providing the resized image as the input for the first set of convolution filters.

Example 19

The method of example 11, wherein the first set of convolution filters is adapted to receive an image depicting one or more white blood cells as the input.

Example 20

A blood cell analysis machine comprising: a) a camera; and b) means for determining a focus distance for the camera based on an image depicting one or more blood cells.

Each of the calculations or operations described herein may be performed using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

All patents, patent publications, patent applications, journal articles, books, technical references, and the like discussed in the instant disclosure are incorporated herein by reference in their entirety for all purposes.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. In certain cases, method steps or operations may be performed or executed in differing order, or operations may be added, deleted or modified. It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention. Accordingly, the claims should not be treated as limited to the examples, drawings, embodiments and illustrations provided above, but instead should be understood as having the scope provided when their terms are given their broadest reasonable interpretation as provided by a general purpose dictionary, except that when a term or phrase is indicated as having a particular meaning under the heading Explicit Definitions, it should be understood as having that meaning when used in the claims.

Explicit Definitions

It should be understood that, in the above examples and the claims, a statement that something is "based on" something else should be understood to mean that it is determined at least in part by the thing that it is indicated as being based on. To indicate that something must be completely determined based on something else, it is described as being "based EXCLUSIVELY on" whatever it must be completely determined by.

It should be understood that, in the above examples and the claims, the phrase "means for determining a focus distance for the camera based on an image depicting one or more blood cells" is a means plus function limitations as provided for in 35 U.S.C. § 112(f), in which the function is "determining a focus distance for the camera based on an image depicting one or more blood cells" and the corresponding structure is a computer configured to use an algorithm as illustrated in FIGS. 4-6 and tables 3-4 and described in the accompanying description.

It should be understood that, in the above examples and claims, the term "set" should be understood as one or more things which are grouped together.

What is claimed is:

1. A system for assessing focal quality of blood cell images comprising:
   a) a camera adapted to capture images of blood samples;
   b) a non-transitory computer readable medium storing:
      i. a plurality of sets of convolution filters;
      ii. a fully connected network layer; and
      iii. instructions operable to, when executed by a processor:
         A) for each set of convolution filters, generate an output having a depth equal to that set of convolution filters' cardinality by performing acts comprising, for each convolution filter in that set of convolution filters, convolving an input with that convolution filter, wherein:
            I) the input for a first set of convolution filters is an image captured by the camera; and
            II) for each set of convolution filters other than the first set of convolution filters, the input for that set of convolution filters is an output generated by a different set of convolution filters; and
         B) generate a focus distance by performing acts comprising, providing an output generated for a set of convolution filters as an input to the fully connected network layer.

2. The system of claim 1, wherein, for each set of convolution filters:
   a) the input to that set of convolution filters has a resolution;
   b) the output generated for that set of convolution filters has a resolution; and
   c) the instructions stored on the non-transitory computer readable medium are operable to reduce the resolution of the output generated for that set of convolution filters from the resolution of the input to that set of convolution filters by pooling pixels in a plurality of regions, and, for each region, including a single value for that region in the output generated for that set of convolution filters.

3. The system of claim 2, wherein, for each region for each set of convolution filters, the single value included for that region in the output generated for that set of convolution filters is a maximum value for that region.

4. The system of claim 1, wherein the non-transitory computer readable medium stores the plurality of sets of convolution filters as weights in a convolutional neural network.

5. The system of claim 1, wherein
   a) the fully connected network layer comprises a plurality of inputs and a plurality of outputs;
   b) the non-transitory computer readable medium stores instructions operable to, when executed by the processor, generate the focus distance by performing acts comprising:
      i) providing each output of the fully connected network layer to an input of a second fully connected network layer; and
      ii) obtaining the focus distance as an output of the second fully connected network layer.

6. The system of claim 1, wherein:
   a) the system comprises a flowcell, wherein the flowcell comprises a viewing zone and is coupled to a source of sample fluid and a source of alignment fluid, wherein the alignment fluid is transparent and has a higher viscosity than the sample fluid; and
   b) the camera is adapted to capture images of blood samples by capturing images of particles comprised by a stream of sample fluid through a layer of alignment fluid disposed between the stream of sample fluid and the camera as the particles comprised by the stream of sample fluid flow through the viewing zone of the flowcell.

7. The system of claim 6, wherein:
   a) the system comprises a motor; and
   b) the instructions stored on the non-transitory computer readable medium comprise instructions operable to, when executed by the processor, focus the camera by using the motor to change a position of the camera relative to the viewing zone of the flowcell based on the focus distance.

8. The system of claim 7, wherein:
   a) the non-transitory computer readable medium is operable to, when executed by the processor, obtain a plurality focus distances, wherein:
      i) each focus distance from the plurality of focus distances corresponds to a different image captured by the camera; and
      ii) the focus distance is comprised by the plurality of focus distances; and
   b) focusing the camera by using the motor to change the position of the camera relative to the viewing zone of the flowcell based on the focus distance comprises:
      i) determining a median of the plurality of focus distances; and
      ii) translating the camera a distance equal to the median of the plurality of focus distances.

9. The system of claim 1, wherein:
   a) the first set of convolution filters is adapted to receive images having a predetermined size as input; and
   b) the non-transitory computer readable medium is operable to, when executed by the processor:
      i) resize a raw image captured by the camera to match the predetermined size; and
      ii) provide the resized image as the input for the first set of convolution filters.

10. The system of claim 1, wherein the first set of convolution filters is adapted to receive an image depicting one or more white blood cells as the input.

11. A method of assessing focal quality of blood cell images comprising:
   a) for each of a plurality of convolution filters, generating an output having a depth equal to that set of convolution filters' cardinality by performing acts comprising, for each convolution filter in that set of convolution filters, convolving an input with that convolution filter, wherein:
      i. the input for a first set of convolution filters is an image captured by a camera and comprises a set of blood cells; and
      ii. for each set of convolution filters other than the first set of convolution filters, the input for that set of convolution filters is an output generated by a different set of convolution filters; and b) generating a focus distance by performing acts comprising, providing an output generated for a set of convolution filters as an input to a fully connected neural network layer.

12. The method of claim 11, wherein, for each set of convolution filters:
   a) the input to that set of convolution filters has a resolution;
   b) the output generated for that set of convolution filters has a resolution; and
   c) the method comprises reducing the resolution of the output generated for that set of convolution filters from the resolution of the input to that set of convolution filters by pooling pixels in a plurality of regions, and, for each region, including a single value for that region in the output generated for that set of convolution filters.

13. The method of claim 12, wherein, for each region for each set of convolution filters, the single value included for that region in the output generated for that set of convolution filters is a maximum value for that region.

14. The method of claim 11, wherein
   a) the fully connected neural network layer comprises a plurality of inputs and a plurality of outputs; and
   b) the method comprises generating the focus distance by performing acts comprising:
      i. providing each output of the fully connected neural network layer to an input of a second fully connected neural network layer; and
      ii. obtaining the focus distance as an output of the second fully connected neural network layer.

15. The method of claim 11, wherein the method comprises capturing the image provided as input to the first set of convolution filters by performing acts, comprising:
   a) flowing a stream of sample fluid through a flowcell, wherein the flowcell comprises a viewing zone and is coupled to a source of sample fluid and a source of alignment fluid, wherein the alignment fluid is transparent and has a higher viscosity than the sample fluid; and
   b) imaging a particle comprised by the stream of sample fluid through a layer of alignment fluid disposed between the stream of sample fluid and the camera as the particle comprised by the stream of sample fluid flows through the viewing zone of the flowcell.

16. The method of claim 15, wherein the method comprises focusing the camera by using a motor to change a position of the camera relative to the viewing zone of the flowcell based on the focus distance.

17. The method of claim 16, wherein:
   a) the method comprises obtaining a plurality focus distances, wherein:
      i. each focus distance from the plurality of focus distances corresponds to a different image captured by the camera; and
      ii. the focus distance is comprised by the plurality of focus distances; and
   b) focusing the camera by using the motor to change the position of the camera relative to the viewing zone of the flowcell based on the focus distance comprises:
      i. determining a median of the plurality of focus distances; and
      ii. translating the camera a distance equal to the median of the plurality of focus distances.

18. The method of claim 11, wherein:
   a) the first set of convolution filters is adapted to receive images having a predetermined size as input; and
   b) the method comprises:
      i. resizing a raw image captured by the camera to match the predetermined size; and
      ii. providing the resized image as the input for the first set of convolution filters.

19. The method of claim 11, wherein the first set of convolution filters is adapted to receive an image depicting one or more white blood cells as the input.

20. A system for assessing focal quality of blood cell images comprising:
   a) a set of convolution filters adapted to receive images of blood cells; and
   b) a processor configured to:
      i) for each set of convolution filters, generate an output having a depth equal to a plurality of sets of convolution filters' cardinality by performing acts comprising, for each convolution filter in that set of convolution filters, convolving an input with that convolution filter, wherein:
         for each set of convolution filters other than the first set of convolution filters, the input for that set of convolution filters is an output generated by a different set of convolution filters; and
      ii) generate a focus distance by performing acts comprising, providing an output generated for a set of convolution filters as an input to the fully connected network layer.

* * * * *